United States Patent [19]
Kanza et al.

[11] Patent Number: 5,258,910
[45] Date of Patent: Nov. 2, 1993

[54] TEXT EDITOR WITH MEMORY FOR ELIMINATING DUPLICATE SENTENCES

[75] Inventors: Hiroyuki Kanza, Kyoto; Shigeki Kuga, Nara; Taro Morishita, Kyoto; Masahiro Wada, Nara, all of Japan

[73] Assignee: Sharp Kabushiki Kaisha, Osaka, Japan

[21] Appl. No.: 938,535

[22] Filed: Sep. 2, 1992

Related U.S. Application Data

[63] Continuation of Ser. No. 386,708, Jul. 31, 1989, abandoned.

[30] Foreign Application Priority Data

Jul. 29, 1988 [JP] Japan ................................ 63-190962

[51] Int. Cl.$^5$ ............................................. G06F 15/38
[52] U.S. Cl. ................................................. 364/419.1
[58] Field of Search ............... 364/200, 400, 260.6, 364/260.7, 222.81, 283.1, 951.3, 943, 419; 341/51, 67, 55, 106; 395/600

[56] References Cited

U.S. PATENT DOCUMENTS

| 4,558,302 | 12/1985 | Welch | 340/347 DD |
|---|---|---|---|
| 4,782,325 | 11/1988 | Jeppsson et al. | 341/55 |
| 4,843,389 | 6/1989 | Lisle et al. | 341/106 |
| 4,876,541 | 10/1989 | Storer | 341/51 |
| 4,949,302 | 8/1990 | Arnold et al. | 364/900 |
| 4,959,785 | 7/1990 | Yamamoto | 364/419 |

FOREIGN PATENT DOCUMENTS 59-014037 1/1984 Japan .
2154035A 8/1985 United Kingdom .

OTHER PUBLICATIONS

IBM Technical Disclosure Bulletin, vol. 27, No. 12, May 1985 "Vocabulary-Based Memory Compression".

Primary Examiner—Roy N. Envall, Jr.
Assistant Examiner—A. Bodendorf

[57] ABSTRACT

A text processing system for example a word processor includes a storage unit with two storage devices. The first storage device can store at least two character strings in an arbitrary order. The second storage device can store at least one index. Each stored index designates a predetermined one of the character strings. The indexes stored are in a predetermined order.

7 Claims, 8 Drawing Sheets

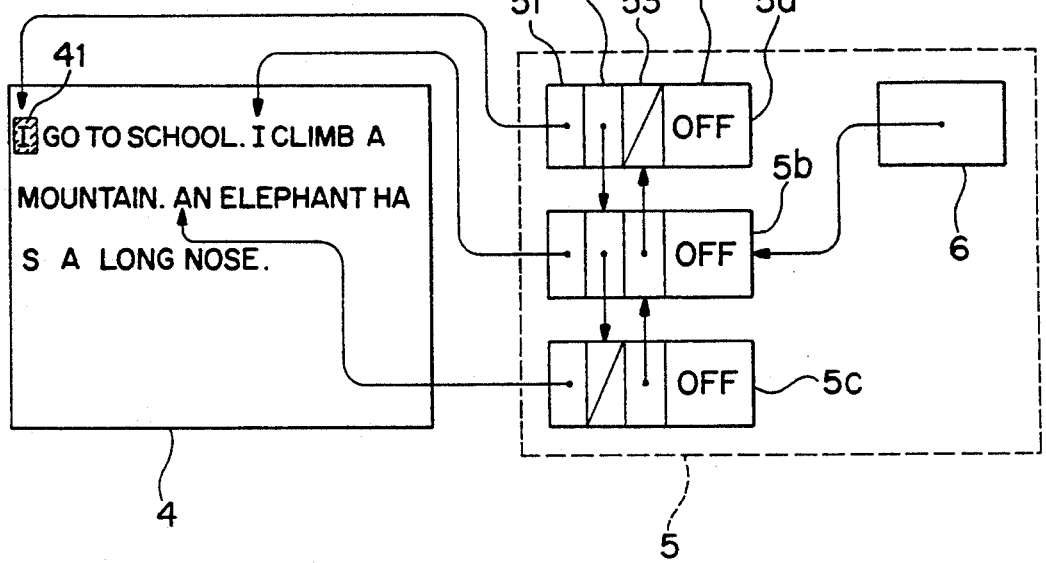
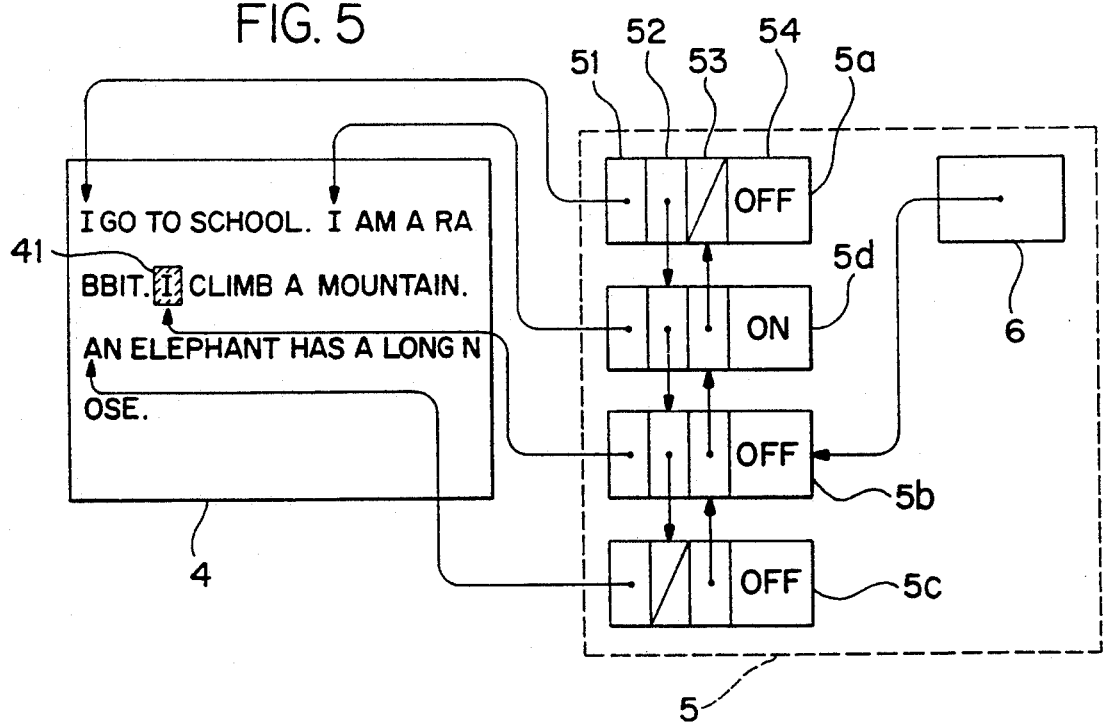

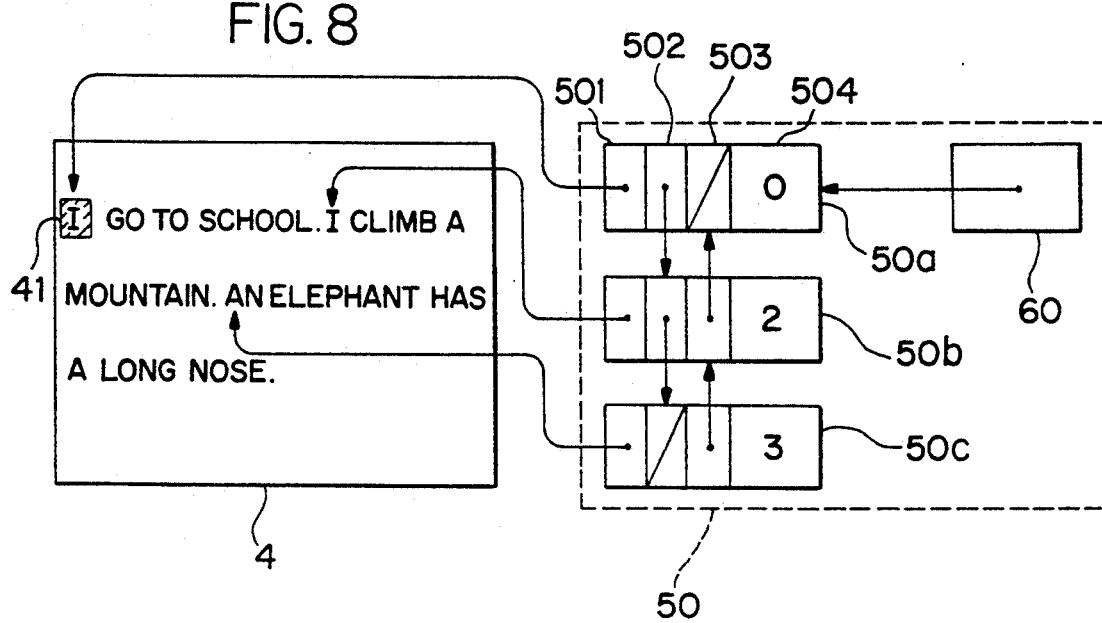
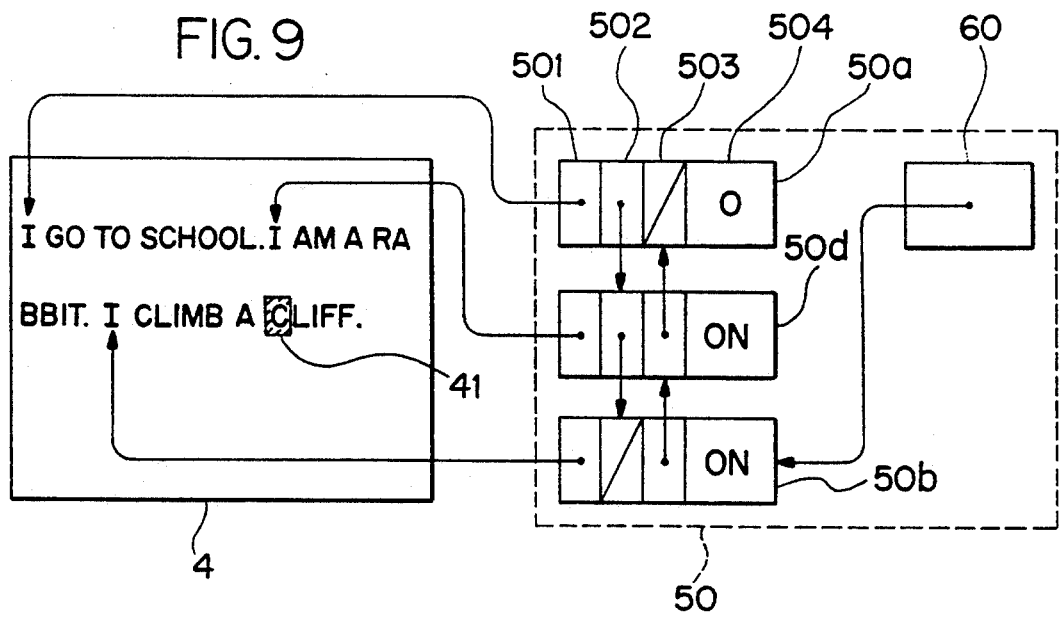

TEXT EDITOR WITH MEMORY FOR ELIMINATING DUPLICATE SENTENCES

This application is a continuation of application Ser. No. 07/386,708 filed on Jul. 31, 1989, now abandoned.

BACKGROUND OF THE INVENTION

1. Field of the Invention:

This invention relates to a text processing system such as a word processor, and more particularly to a text processing system in which the utilization efficiency of a storage medium can be improved.

2. Description of the Prior Art:

In recent years, text processing systems such as a so-called word processor have come into use in increasing numbers for preparing texts or documents which contain character strings or sentences. Texts prepared on such a text processing apparatus are usually stored on a storage medium such as a magnetic disk or IC memory in a magnetic or electronic form. Since the storage medium such as a magnetic disk has an extremely high recording density as compared with a traditional storage medium such as paper, such storage medium have an advantage in that the space for storing texts can be greatly reduced. A text processing system can permit the easy preparation of a new text by partially modifying a text which has been stored on a storage medium.

In a conventional text processing system, texts are stored on a storage medium such as magnetic disk, by reserving in the storage medium a storage area (called a file) for every one of the texts, and by storing each text in one file. When a plurality of texts containing a sentence(s) common to them are stored on a storage medium, the common sentence(s) must be stored in each of several files, which causes a problem in terms of the efficient utilization of the storage medium. This will be described with reference to FIG. 12.

When two texts A and B having a common sentence "I go to school." are stored on a storage medium, the two texts A and B are stored in two files 120 and 121, respectively. This means that the same sentence exists in both the files 120 and 121, resulting in the wasted use of the storage area of the medium.

In the above-mentioned example, the two files storing respectively the two texts contain only one common sentence. When a new text is prepared by partly modifying a text which have been previously prepared and stored in a storage medium (hereinafter, such a text is referred to as "an old text"), however, it is usual that numerous sentences are commonly stored in both the file for the old text and that for the new text. In many texts actually prepared, stereotyped sentences may account for a relatively large part of the text. When a large number of such documents are prepared using old texts, the use efficiency of a storage area of a storage medium is greatly reduced.

SUMMARY OF THE INVENTION

The text processing system of this invention, which overcomes the above-discussed and numerous other disadvantages and deficiencies of the prior art, comprises a text storage unit, said text storage unit comprises: a first storage means for storing two or more character strings in an arbitrary order; and a second storage means for storing one or more indexes each of which designates a predetermined one of said character strings, said indexes being stored in a predetermined order.

In a preferred embodiment, the system further comprises a text edit unit, said text edit unit comprises: a third storage means for storing one or more character strings; a control means for placing character strings in said first storage means designated by said indexes into said third storage means in the order which coincides with said predetermined order; character string management means which respectively correspond to character strings stored in said third storage means, said character string management means having a status indicator for indicating one of at least two states including first and second states, said first status indicating that the corresponding character string has not been modified, said second status indicating that the corresponding character string has been modified; and a setting means for, when any of character strings stored in said third storage means has been modified, setting said status indicator of the character string management means corresponding to said modified character string to said second state, and for, when a further character string is added to said third storage means, producing additionally a further character string management means which corresponds to said further character string, and for setting the status indicator of said further character string management means to said second status.

In a preferred embodiment, the character string management means, when said status indicator of said character string management means indicates said first status, has the same index as the index designating a character string which is identical to the character string in said third storage means which string corresponds to said character string management means.

In a preferred embodiment, the system comprises a further control means for inspecting said status indicators of said character string management means in the order of the arrangement of the character strings in said third storage means, and for, when the status indicator of a character string management means indicates said first status, storing the status indicators of said character string management means into said second storage means, and for, when the status indicator of a character string management means indicates said second status, storing the character string corresponding to said character string management means into an unused area of said first storage means, and generating an index designating said stored character string, said generated index being stored in said second storage means.

Thus, the invention described herein makes possible the objectives of (1) providing a text processing system which can store texts containing common character strings, in a reduced storage area; and (2) providing a text processing system which can improve the utilization efficiency of a storage area of a storage medium.

BRIEF DESCRIPTION OF THE DRAWINGS

This invention may be better understood and its numerous objects and advantages will become apparent to those skilled in the art by reference to the accompanying drawings as follows:

FIGS. 4, 5, 6, and 7 are diagrams for illustrating the operation of the text edit unit of FIG. 2.

FIG. 8 illustrates another text edit unit.

FIG. 9 is a diagram for illustrating the operation of the text edit unit of FIG. 8.

DESCRIPTION OF THE PREFERRED EMBODIMENTS

Figure 1:
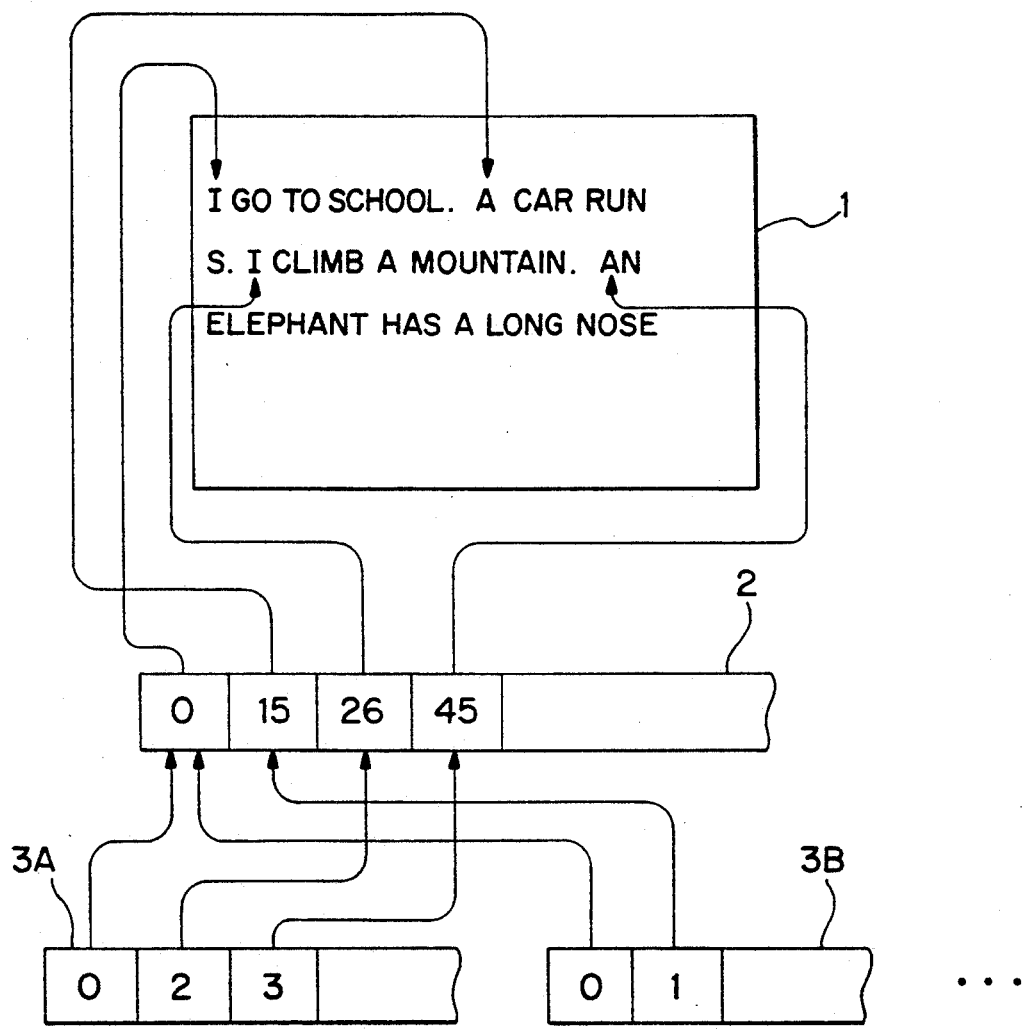
FIG. 1 illustrates diagrammatically the text storage unit of a text processing system according to the invention.

FIG. 1 illustrates diagrammatically the text storage unit of a text processing system according to the invention. The text storage unit of FIG. 1 has an integrated text file 1, a top position file 2, and one or more index files 3A and 3B. The integrated text file 1 is a file in which a plurality of sentences are stored. Unlike ordinary text files, the integrated text file 1 stores in a mixed manner sentences which are contained in a plurality of texts. Relationships between the sentences of each individual text and those in the integrated text file 1 are managed by the top position file 2 and the index files 3A, 3B, ----. In the embodiment, one top position file is provided for an integrated text file, and one index file is provided for each text stored in an integrated text file.

The top position file 2 stores the top position of each sentences stored in the integrated text file 1. In the ith (i=0, 1, - - -) memory cell in the top position file 2, stored is data which indicates the top position of the ith (i=0, 1, - - -) sentence stored in the integrated text file 1. In the embodiment, the data in the ith memory cell denotes the number of bytes existing between the top of the integrated text file 1 and the top of the ith sentence. For example, in FIG. 1, the 0th and 1st sentences have their respective tops at the 0th and 15th bytes in the integrated text file 1. In FIG. 1, arrows leading from memory cells in the top position file 2 to the integrated text file 1 indicate the relationships between the memory cells and the top positions of sentences.

Figure 12:
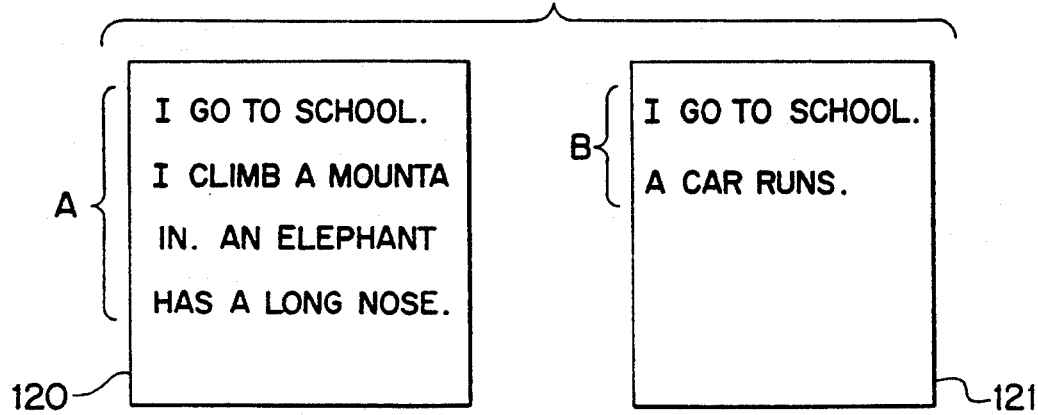
FIG. 12 is a diagram for illustrating the way of storing texts in a conventional text processing system.

The index files 3A and 3B contain data indicating the texts to which each of the sentences belong and also the order in which sentences are arranged in individual texts. In this embodiment, the index files 3A and 3B respectively correspond to the texts A and B shown in FIG. 12. If a value k is stored in the jth (j=0, 1, - - -) memory cell in one of the index files 3A and 3B, it indicates that the data denoting the location in the integrated text file 1 of the top position of the jth sentence in the text corresponding to that index file is stored in the kth memory cell in the top position file 2. In other words, each data in the index files 3A and 3B indirectly indicates the corresponding sentence in the integrated text file 1 via the top position file 2. Also, if the value stored in the jth memory cell in one of the index files 3A and 3B is k as described above, it can be said that the jth sentence in the text corresponding to that index file is stored in the integrated text file 1 as the kth sentence. Hereinafter, each data in the index files 3A and 3B is referred to as "an index". In FIG. 1, arrows are also provided to visually indicate the relationships between indexes in the index files 3A and 3B and memory cells in the top position file 2.

It is apparent from the above description that the text A consists of sentences "I go to school. I climb a mountain. An elephant has a long nose.", and that the text B consists of sentences "I go to school. A car runs."

When a plurality of texts containing a common sentence are stored in the text storage unit, the common sentence occupies only one area in the text storage unit, thereby reducing the area necessary for storing the texts.

The top position file 2 may be omitted, and instead, the data denoting the top position of a sentence in the integrated text file 1 may be stored in the memory cell of the index files 3A and 3B. It should be noted, however, that the index denoting the memory cell number in the top position file 2 uses a fewer number of bits than the data denoting the top position of a sentence. Therefore, in the case of preparing a large number of texts, thus, a large number of index files, or in the case of storing a large number of sentences in the integrated text file 1, it is preferable to construct the text storage unit as shown in FIG. 1 in the view point of the utilization efficiency of the storage area. In the above-described embodiment, texts are managed in units of sentences which end with a period, but alternatively, it is also possible to use any symbol as a delimiter and to manage texts in units of clauses or other character strings of any given length.

A text edit unit for editing texts stored in the text storage unit will be described. When a sentence is modified or a new sentence is added in the process of editing a text stored in the text storage unit, it is necessary to store the modified sentence or the added sentence in the integrated text file 1 at the time of entering the edited text as a new text into the text storage unit. Therefore, each sentence in the edited text needs to be checked to determine if it is a modified sentence, an added sentence or an unedited sentence. It would not be infeasible to compare character by character between the original text and the edited text to detect the modified and added sentences, but this would require a sophisticated search system and take a lot of time and effort. The text edit unit of the preferred embodiment is provided with a sentence management facility by which modified and added sentences can be simply detected, as described below.

Figure 2:
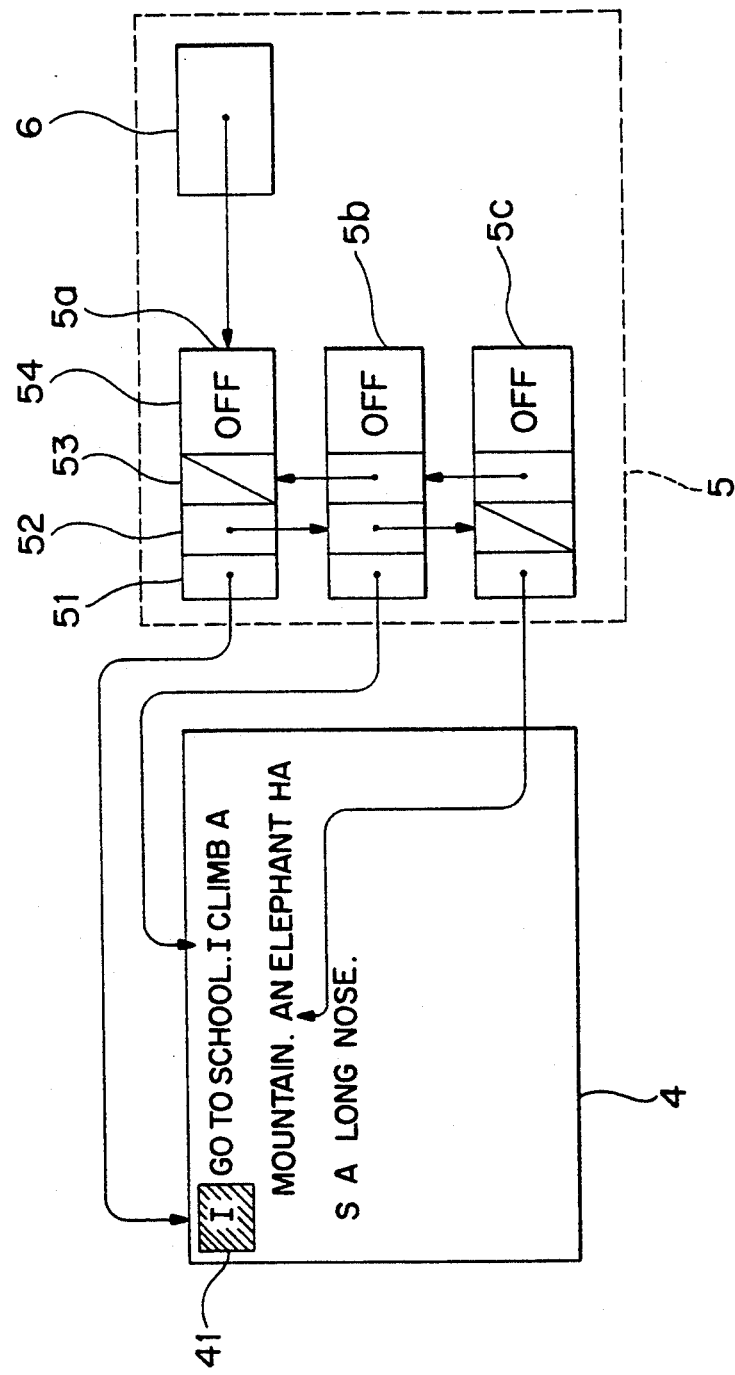
FIG. 2 illustrates diagrammatically a text edit unit in the embodiment of FIG. 1.

FIG. 2 illustrates schematically the text edit unit of this embodiment. The text edit unit comprises a work memory 4 and a sentence management section 5. The work memory 4 is a memory in which a text is edited. Usually, the contents of the work memory 4 are displayed on a display unit (not shown). When the contents of the work memory 4 are changed through the text manipulation such as the insertion or deletion of characters, the change is reflected in the contents displayed on the display unit. When the text edit unit is activated, the text to be edited is loaded from the text storage unit shown in FIG. 1 into the work memory 4. FIG. 2 shows the work memory 4 into which the text A has been loaded.

The sentence management section 5 comprises sentence management elements 5a, 5b and 5c each corresponding exclusively to one of the sentences in the text being edited. Each of the sentence management elements 5a, 5b and 5c comprises the following four subelements:

(1) a pointer 51 indicating the top of the corresponding sentence in the work memory 4;

(2) a pointer 52 indicating the sentence management element corresponding to the subsequent sentence;

(3) a pointer 53 indicating the sentence management element corresponding to the preceding sentence; and (4) a sentence status flag 54.

As shown in FIG. 2, the sentence management elements 5a, 5b and 5c constitute a bidirectional list in which the elements are linked to each other by the pointers 52 and 53. Hereinafter, this bidirectional list is referred to as "the sentence management list". The pointer 53 of the sentence management element 5a corresponding to the 0th sentence "I go to school." in the work memory 4 and the pointer 52 of the sentence management element 5c corresponding to the endmost sentence "An elephant has a long node." are set to nil because no object which they should indicate exists. In the figures, the nil state is indicated by a diagonal line.

The sentence status flag 54 is a flag which indicates whether a sentence in the work memory 4 has been modified or not. If a sentence is in the unmodified status, the sentence status flag 54 of the sentence management element corresponding to that sentence is OFF. If a sentence is a modified one or an added one, the sentence status flag 54 for that sentence is set to ON. FIG. 2 shows the state wherein the text A is loaded into the work memory 4, therefore, the sentence status flags 54 for all sentence management elements 5a, 5b and 5c are set to OFF.

The sentence management section 5 further comprises a current sentence pointer 6. The current sentence pointer (hereinafter abbreviated as "CSP") 6 indicates the sentence where a cursor 41 is currently positioned in the work memory 4. In practice, the CSP 6 is a pointer to point one of the sentence management elements 5a, 5b and 5c which corresponds to the sentence where the cursor 41 is positioned.

When a sentence is added to a text during the edition, a sentence management element which corresponds to the added sentence is generated to be inserted in an appropriate position on the sentence management list. On the other hand, when a sentence is deleted, the sentence management element corresponding to the deleted sentence is deleted from the sentence management list.

Figure 3:
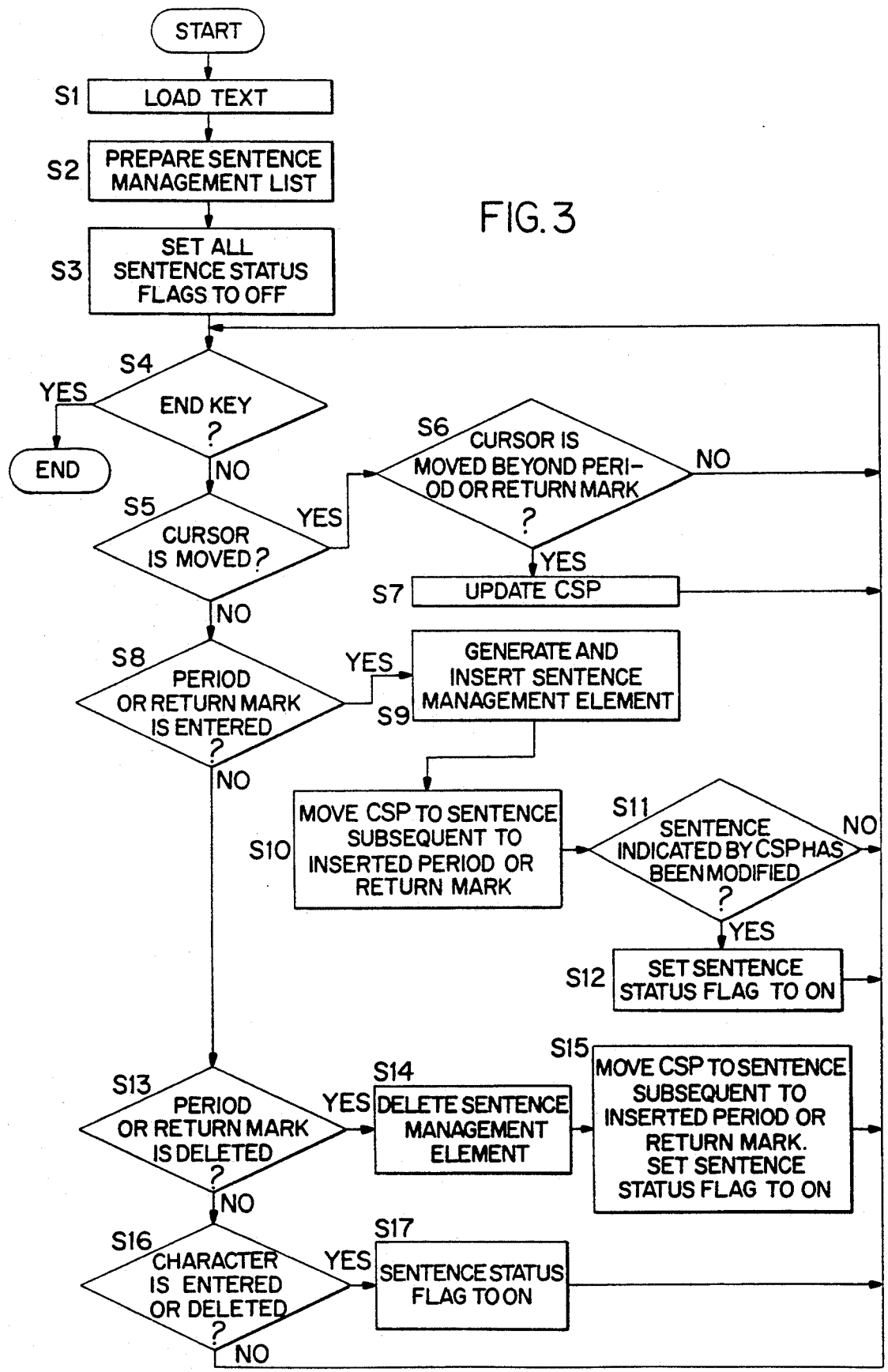
FIG. 3 is a flowchart of the operation of the text edit unit of FIG. 2.

When a keyboard or other input device (not shown) is operated, the text edit unit works to perform the operations such as the insertion and deletion of characters on the work memory 4 in response to the key operation, in the same manner as conventional text edit units. Referring now to the flowchart of FIG. 3, the unique operations of the text edit unit which are not available with conventional editors will be described.

First, a text to be edited is loaded from the text storage unit into the work memory 4 (step S1). The loading of the text is performed referring to the index files 3A and 3B and top position file 2 shown in FIG. 1. In the case of loading the text A, the indexes retained in the memory cells of the index file 3A are sequentially checked. Referring to the contents of the memory cell of the top position file 2 indicated by the indexes in the index file 3A, object sentences are retrieved from the integrated text file 1 to be loaded sequentially into the work memory 4.

In accordance with the text loaded into the work memory 4, a sentence management list is generated as shown in FIG. 2 (step S2). The sentence status flags 54 for all sentence management elements 5a, 5b and 5c on the generated sentence management list are set to OFF (step S3).

Thereafter, the edit operation proceeds, according to the key operation in the input device, as follows:

(a) When an end key is pressed, the edit operation is terminated (step S4).

(b) When a cursor key is operated and the cursor 41 is moved beyond a period or a return mark, the CSP 6 is updated so that it points to the sentence management element 5a, 5b or 5c corresponding to the sentence to which the cursor 41 has been moved (steps S5-S7). Thus, in this embodiment, the text edit unit recognizes a period or a return mark as a delimiter separating one sentence from another.

(c) When a period or a return mark is entered, it is assumed that a new sentence has been inserted. A sentence management element corresponding to the new sentence is generated to be inserted in an appropriate position on the sentence management list by reconnecting the corresponding pointers. The sentence status flag 54 of the generated sentence management element is set to ON. Then, the CSP 6 is moved to the sentence management element corresponding to the sentence subsequent to the inserted period or return mark, and if there is any modification made to the sentence, the sentence status flag 54 for that sentence is set to ON (steps S8-S12).

(d) When a period or a return mark is deleted from a sentence, the sentence management element corresponding to the sentence is deleted from the sentence management list. The CSP 6 is moved to the sentence management element corresponding to the sentence subsequent to the deleted period or return mark, while the sentence status flag 54 for that sentence is set to ON (steps S13-S15).

(e) When any character or symbol other than a period or a return mark is entered or deleted, the sentence status flag 54 of the sentence management element to which the CSP 6 points is set to ON (steps S16-S17).

At the end of the edit operation, modified and added sentences in the text can be detected by searching the sentence management list for the sentence management elements having the sentence status flag 54 which is set to ON. Because the text edit unit of this embodiment is provided with the sentence management section 5, it is possible to determine with ease whether each sentence in the edited text is a modified sentence, an added sentence, or an unmodified sentence.

FIGS. 4 to 7 illustrate the changes in the sentence management section 5 when the text A is edited to prepare a new text C containing sentences "I go to school. I am a rabbit. I climb a cliff." Before the start of editing the text, the state of the text edit unit is as shown in FIG. 2. When the cursor 41 is moved from the 0th sentence "I go to school." to the 1st sentence "I climb a mountain.", the contents of the CSP 6 are changed so as to indicate the sentence management element 5b corresponding to the 1st sentence. When a new sentence "I am a rabbit." is inserted between the 0th and 1st sentences, a sentence management element 5d corresponding to the new sentence is generated to be inserted between the sentence management elements 5a and 5b, as shown in FIG. 5. As is well known in the field of processing lists, the insertion of the sentence management element 5d is performed by copying the pointer 52 of the sentence management element 5a and the pointer 53 of the sentence management element 5b respectively to the pointers 52 and 53 of the sentence management element 5d, while the pointer 52 of the sentence management element 5a and the pointer 53 of the sentence management element 5b are changed so as to indicate the new sentence management element 5d. The sentence status flag 54 of the sentence management element 5d is set to ON.

Figure 6:
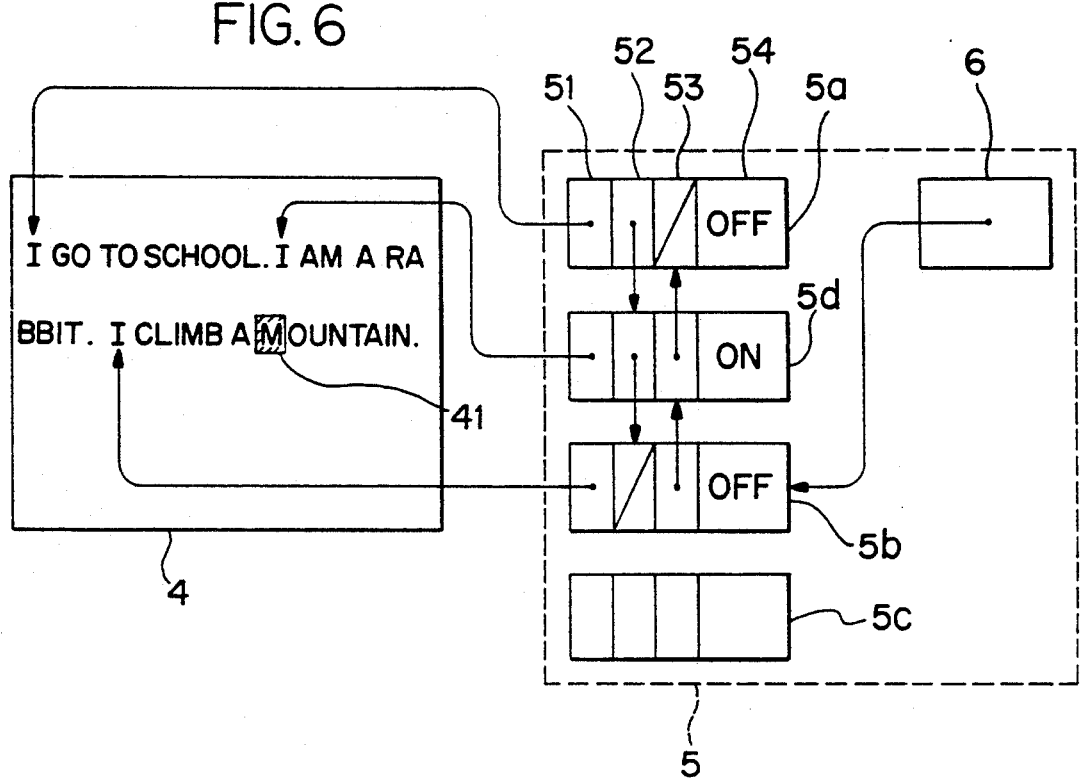
Figure 7:
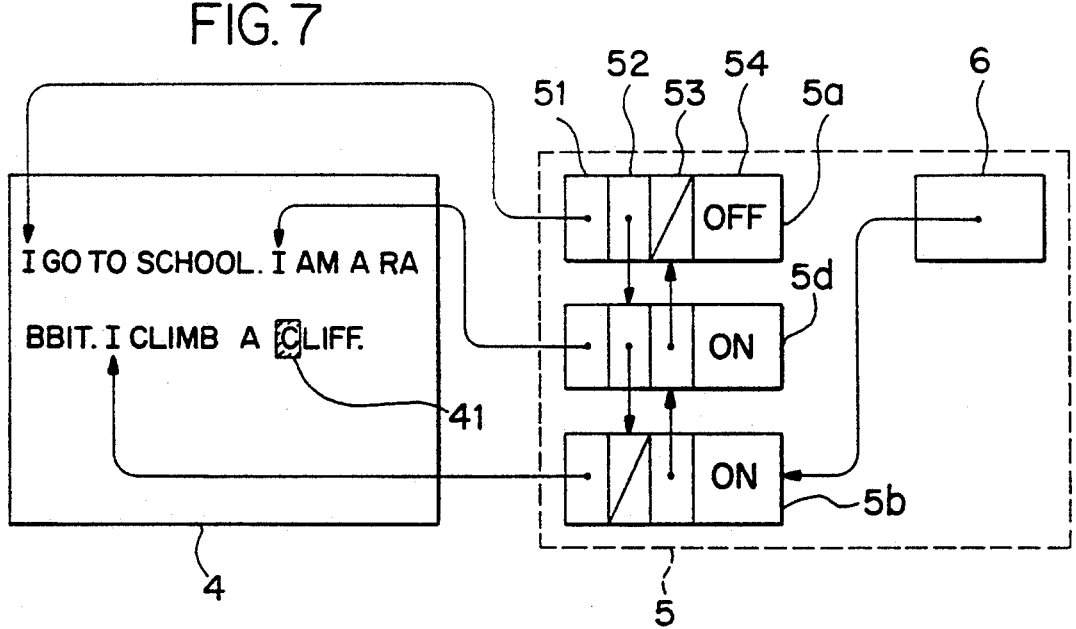

Next, the 4th sentence "An elephant has a long nose" is deleted. In this case, as shown in FIG. 6, the sentence management element 5c corresponding to this deleted sentence is deleted from the sentence management list. The deletion of the sentence management element 5c is performed by copying the pointer 52 of the sentence management element 5c corresponding to the deleted sentence, to the pointer 52 of the sentence management element 5b. If the deleted sentence is not the last one in the text, the pointer 53 of the sentence management element 5c is copied to the pointer 53 of the sentence management element corresponding to the sentence subsequent to the deleted sentence. Lastly, the 2nd sentence "I climb a mountain" is modified to read "I climb a cliff", and the sentence status flag 54 of the sentence management element 5b corresponding to this modified sentence is set to ON (FIG. 7).

As a result of the above editing operations, the text A is modified to the new text C which says "I go to school. I am a rabbit. I climb a cliff."

It should be noted that when a sentence is added to or deleted from a text, corresponding sentence management elements are inserted and deleted, as described above, so that the order in which the sentence management elements are arranged on the sentence management list always agrees with the order of the sentences in the work memory 4.

The way of saving the thus edited text into the text storage unit shown in FIG. 1 will be described.

To save an edited text which is retained in the text edit unit into the text storage unit, the following processes are required:

(1) to generate an index file corresponding to the text to be saved; and (2) to enter modified and added sentences into the integrated text file 1.

With the afore-mentioned text edit unit, the process (1) for the generation of an index file requires a relatively complex procedure. A more improved text edit unit in which index files can be generated in more simplified manner when a text is saved.

In the afore-mentioned text edit unit, when loading a text, the sentence management elements 5a, - - - corresponding to the sentences in the text are generated, and the sentence status flags 54 of the sentence management elements 5a, - - - are set to OFF. By contrast, in the text edit unit hereinafter described, a copy of the index retained in the index file for each sentence in the loaded text is stored into the sentence management element corresponding to that sentence. This store of the index may be performed by substituting it into the sentence status flag 54.

FIG. 8 shows the text edit unit with the text A loaded. The indexes "0", "2" and "3" read from the index file 3A are substituted respectively into sentence status flags 504 of sentence management elements 50a, 50b and 50c which are provided in a sentence management section 50. When any sentence in the work memory 4 is modified or when a new sentence is added in the work memory 4, the sentence status flag 504 of the sentence management element corresponding to the modified or added sentence is set to ON. Therefore, in this text edit unit, the retention of numeric data in one of the sentence status flags 504 indicates that the sentence corresponding to the sentence status flag 504 has not been modified. That is, the sentence status flags 504 function both as indicators of the sentence status and as storage means for storing indexes. The sentence management section 50 may be constructed in the same manner as the sentence management section 5 of FIG. 2, except that indexes are stored in the sentence status flags 504.

FIG. 9 shows the text edit unit shown in FIG. 8 wherein the text C is prepared by editing the text A. Since the sentence corresponding to the sentence management element 50a is not modified, the sentence status flag 504 of the element remains "0". On the other hand, since the sentences corresponding to the sentence management elements 50d and 50b are an added sentence and a modified sentence respectively, the sentence status flags 504 of these elements are both set to ON.

Figure 10:
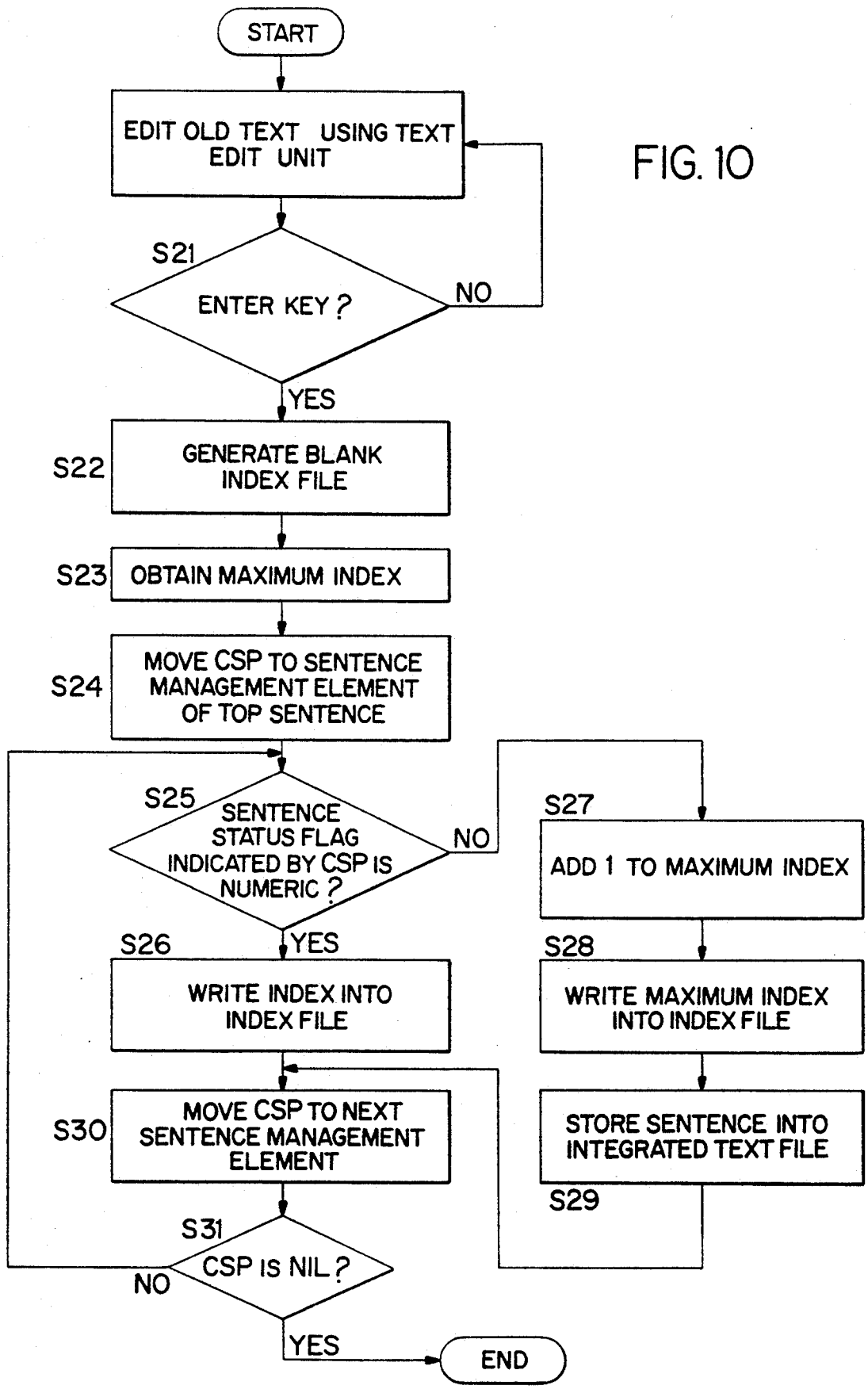
FIG. 10 is a flowchart for illustrating the operation of storing a text prepared using the text edit unit of FIG. 8.

Referring now to the flowchart of FIG. 10, the procedure for saving the text edited via the above text edit unit into the text storage unit will be described.

By pressing the enter key on the input device, the saving process is initiated (step S21). First, a blank index file with no indexes stored is generated (step S22). The index for the sentence stored at the end of the integrated text file 1 (hereinafter referred to as "the maximum index") is obtained (step S23). The maximum index can be easily obtained by inspecting the number of the first empty memory cell in the top position file 2.

The CSP 60 is made to point the sentence management element corresponding to the top sentence in the work memory 4 (step 24). The sentence management element indicated by the CSP 60 is the currently interested sentence management element. It is judged whether the sentence status flag 504 of the currently interested sentence management element consists of numeric data or not, that is, whether the sentence status flag 504 contains an index or is in the ON state (step S25).

When an index is stored in the sentence status flag 504, the index is written into the first empty memory cell in the generated index file (step S26), then the procedure proceeds to step S30.

When the sentence status flag 504 is ON, 1 is added to the maximum index to update the maximum index (step S27), and the updated maximum index is written into the first empty memory cell in the index file (step S28). Then, the sentence corresponding to the currently interested sentence management element is stored in the position immediately after the last sentence in the integrated text file 1, the top position of the stored sentence is written into the Lth memory cell in the top position file 2, supposing the maximum index is L (step S29).

The contents of the CSP 60 are changed to indicate the sentence management element corresponding to the subsequent sentence (step S30). This is accomplished by substituting the pointer 52 of the currently interested sentence management element into the CSP 60. If the CSP 60 is nil, the saving process is terminated, and if the CSP 60 is not nil, the procedure returns to step S25.

Figure 11:
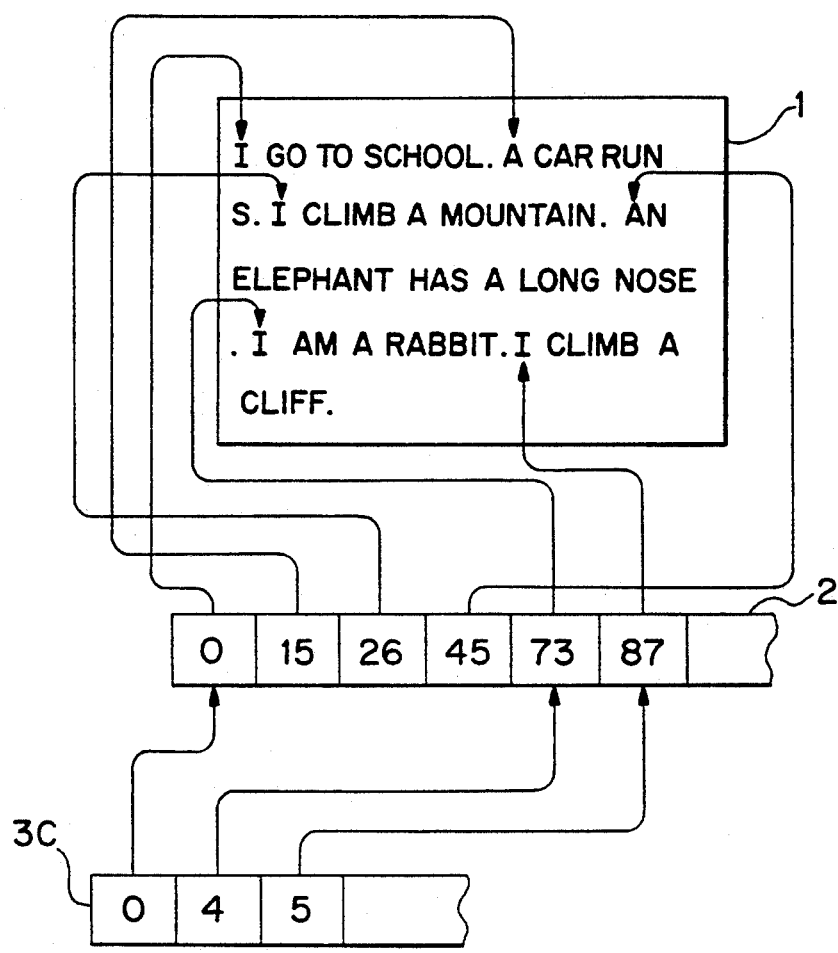
FIG. 11 illustrates diagrammatically a text storage unit in which a new text is stored.

As a specific example, the way of saving the text C shown in FIG. 9 will be described. FIG. 11 shows the text storage unit in which the text C is stored in the text storage unit of FIG. 1. An index file 3C is the index file corresponding to the text C.

The sentence status flag of the sentence management element 3a corresponding to the top (or 0th) sentence "I go to school" in the text C is "0". Therefore, "0" is stored in the 0th memory cell in the index file 3C.

Since the maximum index was "3" before the text C is saved, "4" is written into the 1st memory cell of the index file 3C as a result of processing the sentence management element 50d corresponding to the 1st sentence "I am a rabbit" of the text C. Similarly, as a result of processing the sentence management element 50b corresponding to the 2nd sentence "I climb a cliff" of the text C, "5" is written into the 2nd memory cell of the index file 3C. The 1st and 2nd sentences are respectively stored as the 4th and 5th sentences in the integrated text file 1, as shown in FIG. 11. In the 4th and 5th memory cells in the top position file 2 are written the top positions in the integrated text file 1 of the 4th and 5th sentences newly stored therein.

Texts written in English are used as examples to describe the embodiments of the invention, but it is apparent that the present invention is applicable to a text processing system for any language.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A text processing system comprising a text storage unit and a text edit unit, said text storage unit comprising:
    a first storage means for storing two or more character strings in only an arbitrary mixed order; and
    a second storage means for storing one or more indexes each of which indicates one of said character strings, the character strings indicated by said one or more indexes constituting at least one portion of a text, said one or more indexes being stored in an order arranged in said text,
    said text edit unit comprising:
    a third storage means for storing one or more character strings;
    a control means for placing character strings from said first storage means by said one or more indexes into said third storage means in said order;
    one or more character string management means each of which corresponds only to a single character string stored in said third storage means, said character string management means having a status indicator for indicating one of at least two states including first and second statuses, said first status indicating that the corresponding character string has not been modified, said second status indicating that a corresponding character string has been modified; and
    a setting means for, when any of character strings stored in said third storage means has been modified, setting said status indicator of the character string management means corresponding to a modified character string to said second status, and when a further character string is added to said third storage means by an operator, generating additionally a further character string management means which corresponds only to said further character string, and for setting the status indicator of said further character string management means to said second status.

2. A text processing system according to claim 1, wherein said character string management means, when said status indicator of said character string management means indicates said first status, has the same index as the index designating a character string which is identical to a character string in said third storage means which string corresponds to said character string management means.

3. A text processing system according to claim 2, wherein said system comprises a further control means for inspecting said status indicators of said character string management means in said order, and for, when the status indicator of a character string management means indicates said first status, placing the index of said character string management means into said second storage means, and for, when the status indicator of a character string management means indicates said second status, storing the character string corresponding to said character string management means into an unused area of said first storage means, and generating an index designating said stored character string, said generated index being stored in said second storage means.

4. A text processing system comprising a text storage unit, said text storage unit comprising:
    a first storage means for storing one or more nonduplicated sentences only in an arbitrary mixed order;
    second storage means for storing one or more first indexes each of which indicates the position of each of said sentences in said first storage means; and
    third storage means for storing one or more index files each of which stores at least one second index, said at least one second index indicating one of said first indexes, each of said index files corresponding to a text respectively, each of said sentences which is indicated by said second indexes stored in one of said index files via said first indexes constituting at least one portion of said text, said at least one second index being stored in an order in which said sentences are arranged in said text, said system further comprising a text edit unit, said text edit unit comprising:
    fourth storage means for storing one or more sentences;
    control means for placing sentences corresponding to said text from said first storage means into said fourth storage means in said order;
    one or more character string management means which respectively correspond to sentences stored in said fourth storage means, said character string management means having a status indicator for indicating one of at least two states including first and second statuses, said first status indicating that the corresponding sentence has been modified, said second status indicating that a corresponding sentence has been modified; and
    setting means for, when any of sentences stored in said fourth storage means has been modified, setting said status indicator of the character string management means corresponding to a modified sentence to said second status, and for, when a further sentence is added to said fourth storage means by an operator, generating additionally a further character string management means which corresponds to said further sentence, and for setting said status indicator of said further character string management means to said second status.

5. A text processing system according to claim 4, wherein said character string management means, when said status indicator of said character string management means indicates said first status, has said third index designating a character string which is identical to a corresponding character string in said first storage means.

6. A text processing system according to claim 5, wherein said system comprises a further control means for inspecting said status indicators of said character string management means in said order, and for, when said status indicator of a character string management means indicates said first status, storing an index designating said first index which indicates said character string corresponding to said character string management means into said third storage means in said order, and for, when said status indicator of a character string management means indicates said second status, storing the character string corresponding to said character string management means into an unused area of said first storage means, generating an index designating said stored character string, said generated index being stored in said second storage means, and storing an index designating said generated index into said third storage means in said order.

7. A text processing system according to claim 1, further including means for storing two or more indexes each of which indicates the positions of each of said character strings in said first storage means.

* * * * *